United States Patent
Guignon et al.

(10) Patent No.: US 11,886,632 B2
(45) Date of Patent: Jan. 30, 2024

(54) METHOD, DEVICE AND SYSTEM FOR IMMERSING A USER IN A VIRTUAL REALITY APPLICATION

(71) Applicant: Orange, Issy-les-Moulineaux (FR)

(72) Inventors: Richard Guignon, Châtillon (FR); Sébastien Poivre, Châtillon (FR); Gildas Belay, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 18/002,361

(22) PCT Filed: Jun. 17, 2021

(86) PCT No.: PCT/FR2021/051097
§ 371 (c)(1),
(2) Date: Dec. 19, 2022

(87) PCT Pub. No.: WO2021/255395
PCT Pub. Date: Dec. 23, 2021

(65) Prior Publication Data
US 2023/0236662 A1 Jul. 27, 2023

(30) Foreign Application Priority Data

Jun. 19, 2020 (FR) .................................. 2006418

(51) Int. Cl.
*G06F 3/01* (2006.01)
*G02B 27/00* (2006.01)
*G02B 27/01* (2006.01)

(52) U.S. Cl.
CPC .......... *G06F 3/012* (2013.01); *G02B 27/0093* (2013.01); *G02B 27/0101* (2013.01); *G02B 27/017* (2013.01); *G02B 27/0179* (2013.01); *G02B 2027/014* (2013.01); *G02B 2027/0138* (2013.01); *G02B 2027/0187* (2013.01)

(58) Field of Classification Search
CPC .......... G06F 3/012; G06F 3/013; G06F 3/011; G02B 27/017; G02B 2027/0187
See application file for complete search history.

(56) References Cited

U.S. PATENT DOCUMENTS 10,416,837 B2 * 9/2019 Reif .................... G02B 27/017
10,859,831 B1 * 12/2020 Pollard ................ H04N 13/204
10,901,215 B1 * 1/2021 Newcombe ........ G02B 27/0172
(Continued)

OTHER PUBLICATIONS

International Search Report and Written Opinion dated Sep. 13, 2021 for Application No. PCT/FR2021/051097.

*Primary Examiner* — Koosha Sharifi-Tafreshi
(74) *Attorney, Agent, or Firm* — Knobbe, Martens, Olson & Bear, LLP

(57) ABSTRACT

A method which makes it possible to immerse a user in a virtual reality application is described. The method includes controlling the movement of an avatar of a user in a synthetic scene and controlling the movements of a video acquisition system depending on the detected movements of the head of the user. The method also includes playing back content on a screen of a virtual reality helmet of the user, the content being a video stream acquired by the video acquisition system if the position of the eyes of the avatar is in a synthetic object whose volume can be included in a volume in which the video acquisition system is likely to move.

9 Claims, 15 Drawing Sheets

(56) References Cited

U.S. PATENT DOCUMENTS

| | | | |
|---|---|---|---|
| 11,073,902 B1* | 7/2021 | Rahimi | G06F 3/011 |
| 2014/0361976 A1 | 12/2014 | Osman et al. | |
| 2018/0004286 A1 | 1/2018 | Chen | |
| 2019/0385372 A1 | 12/2019 | Cartwright et al. | |

* cited by examiner

METHOD, DEVICE AND SYSTEM FOR IMMERSING A USER IN A VIRTUAL REALITY APPLICATION

RELATED APPLICATIONS

This application is the U.S. National Phase of Application No. PCT/FR2021/051097 entitled "METHOD, DEVICE AND SYSTEM FOR IMMERSING A USER IN A VIRTUAL REALITY APPLICATION" and filed Jun. 17, 2021, which claims the benefit of French Patent Application No. 2006418, filed Jun. 19, 2020, each of which is incorporated by reference in its entirety.

PRIOR ART

The present invention lies in the field of virtual reality.

The virtual reality technologies allow a user to interact with a computer-simulated environment (synthetic scene). They are used in a wide variety of applications and the market for virtual reality helmets is growing rapidly.

Unfortunately, some people may experience discomfort when using virtual reality helmets. Particularly, some people may experience the symptom of kinetosis (motion sickness) which is likely to occur when there is a lag or latency between the head movements and the display of the images on the virtual reality helmet.

Solutions have been envisaged to detect and react to the displacements of the user's head, but they are not satisfactory.

The invention aims an immersion method that allows alleviating this problem.

DISCLOSURE OF THE INVENTION

More specifically, the invention concerns a method for immersing a user in a virtual reality application, this method including:
- a step of monitoring the displacement of an avatar of a user in a synthetic scene;
- a step of monitoring the displacements of a video acquisition system as a function of the detected displacements of the head of the user, the orientation ($OR_{AVT}$) of the avatar (AVT) being monitored as a function of the orientation ($OR_{HD}$) of the head of the user (USR); and
- a step of rendering a content on a screen of a virtual reality helmet of the user, said content being a video stream acquired by said video acquisition system if the position of the eyes of the avatar is in a synthetic object whose volume is able to be comprised in a volume in which the video acquisition system is likely to move.

Correlatively, the invention concerns a device for immersing a user in a virtual reality application, this device including:
- a module for monitoring the displacement of an avatar of a user in a synthetic scene;
- a module for monitoring the displacements of a video acquisition system as a function of the detected displacements of the head of the user, the orientation ($OR_{AVT}$) of the avatar (AVT) being monitored as a function of the orientation ($OR_{HD}$) of the head of the user (USR); and
- a module for rendering a content on a screen of a virtual reality helmet of the user, said content being a video stream acquired by said video acquisition system if the position of the eyes of the avatar is in a synthetic object whose volume can be comprised in a volume in which the video acquisition system is likely to move.

Particularly, the synthetic scene includes the synthetic object whose volume is able to be comprised in a volume in which a video acquisition system is likely to move, said synthetic object being associated prior to the immersion in the displacement volume of the video acquisition system.

Thus, and remarkably, the invention proposes not only to monitor the displacements of a video acquisition system (for example) as a function of the displacements of the head of the user but also to monitor the positioning of the camera at the moment of the remote handling to accentuate the limitation of kinetosis and parallax problems related to the fact that the captured movements in the world reproduced on the screen are not consistent with the movements of the user and the discomfort felt by the user when the course of the acquisition system is blocked (the camera not being able to go further, for example arm length when the camera is fixed on an automated arm).

The video acquisition system is for example a 360° camera positioned on an articulated arm and thus benefiting from 6 degrees of freedom.

Different solutions can be used to detect the position and orientation of the head of a user in real time. Virtual reality helmets able to position the head of the user in space either with sensors external to the helmet or with cameras integrated into the helmet and which film the environment to determine the position of the helmet, are particularly known.

The system for detecting the position of the head of the user and the device for displacing the video acquisition system can be interconnected by a high-performance network of the 5G type with very low latency and very high speed in order to transmit the video stream and the commands for the displacements of the articulated arm in real time.

The immersion device according to the invention recovers the position of the head of the user in real time and sends the displacement commands of the camera, whose video stream is sent back to the virtual reality helmet. This mechanism prevents kinetosis.

Very advantageously, the video stream acquired by the acquisition device is rendered on a screen of a virtual reality helmet of the user only when the eyes of an avatar of the user are in a synthetic object whose volume can be comprised in a volume in which the video acquisition system is likely to move.

This characteristic allows greatly improving the user's experience since, if the displacements of the user have the effect of controlling the displacement of the acquisition device in a position that it cannot occupy in the real world, the video content is no longer rendered to the user.

In one particular embodiment, the content rendered on the screen of the virtual reality helmet is the synthetic scene if the position of the eyes of the avatar is outside the synthetic object.

The user is thus immersed in a virtual world that allows him to take control of the acquisition device as soon as the eyes of his avatar cross the limits of the virtual object.

In one particular embodiment, the content rendered is a transition content between the video stream acquired by said system and the synthetic scene if the position of the eyes of the avatar is close to the limit of the synthetic object.

This transition content is for example a synthetic image of the color of the synthetic object.

As one variant, the transition content is a fade between the video stream acquired by the video acquisition system and the synthetic scene.

The invention also relates to a system including sensors for detecting the displacements of the head of a user, a video acquisition system, a virtual reality helmet and an immersion device as described above, this device being configured to monitor the displacements of the video acquisition system and to render a content on a screen of the virtual reality helmet, this content being a video stream acquired by said video acquisition system if the position of the eyes of an avatar of the user monitored by said device is in a synthetic object whose volume can be comprised in a volume in which the video acquisition system is likely to move.

In one embodiment, the video acquisition system includes two cameras. A motor can allow managing the spacing between the cameras as a function of the spacing between the pupils. If the virtual reality helmet is able to track the user's gaze, the focus point of each camera can be varied.

The invention also relates to a computer program on a recording medium, this program being capable of being implemented in a device or more generally in a computer. This program includes instructions for implementing an immersion method as described above.

This program can use any programming language, and be in the form of source code, object code or intermediate code between source code and object code, such as in a partially compiled form or in any other desirable form.

The invention also relates to computer-readable information medium or recording medium, and including instructions of a computer program as mentioned above.

The information or recording medium can be any entity or device capable of storing the programs. For example, the media can include a storage means, such as a ROM, for example a CD ROM or a microelectronic circuit ROM, or a magnetic recording means, for example a hard disk or a flash memory.

On the other hand, the information or recording medium can be a transmissible medium such as an electrical or optical signal, which can be routed via an electrical or optical cable, by radio link, by wireless optical link or by other means.

The program according to the invention can be particularly downloaded from an Internet-type network.

Alternatively, the information or recording medium can be an integrated circuit in which a program is incorporated, the circuit being adapted to execute or to be used in the execution of one of the methods as described above.

BRIEF DESCRIPTION OF THE DRAWINGS

Other characteristics and advantages of the present invention will become apparent from the description given below, with reference to the appended drawings that illustrate one exemplary embodiment without any limitation. On the figures.

DETAILED DESCRIPTION OF THE PARTICULAR EMBODIMENTS

Figure 1A:
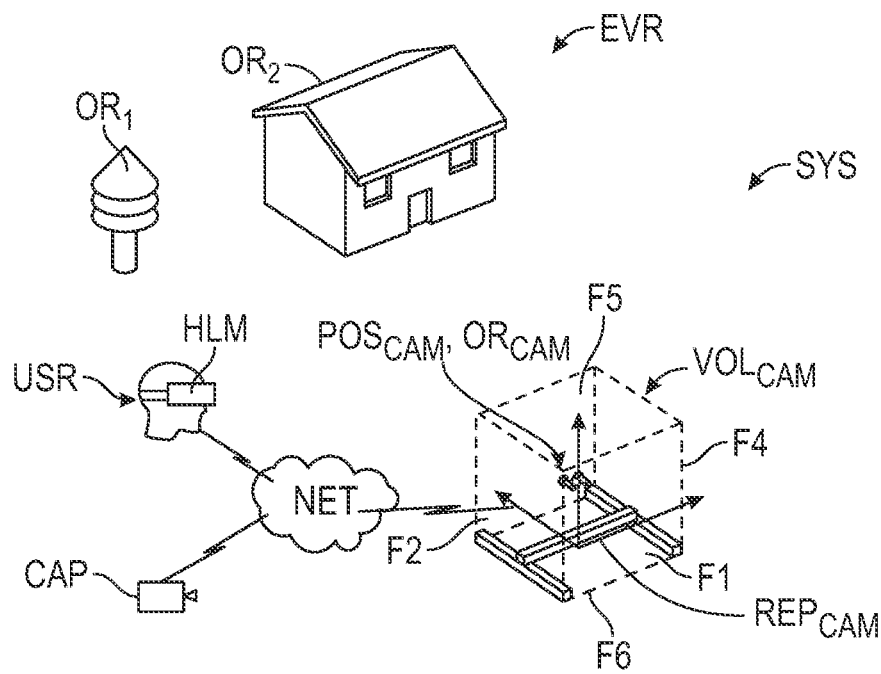
FIG. 1A represents an immersion system in accordance with the invention in its environment.

FIG. 1A represents a system SYS in accordance with one particular embodiment of the invention. This system SYS includes a video acquisition system CAM that can move thanks to an articulated robotic arm in a volume $VOL_{CAM}$ in a real environment EVR. This arm allows for example a displacement and a rotation of the acquisition system according to six degrees of freedom. In the example of FIG. 1A, the real environment includes two real objects: a tree $OR_1$ and a house $OR_2$.

A marker linked to the video acquisition system is denoted $REP_{CAM}$.

Figure 1B:
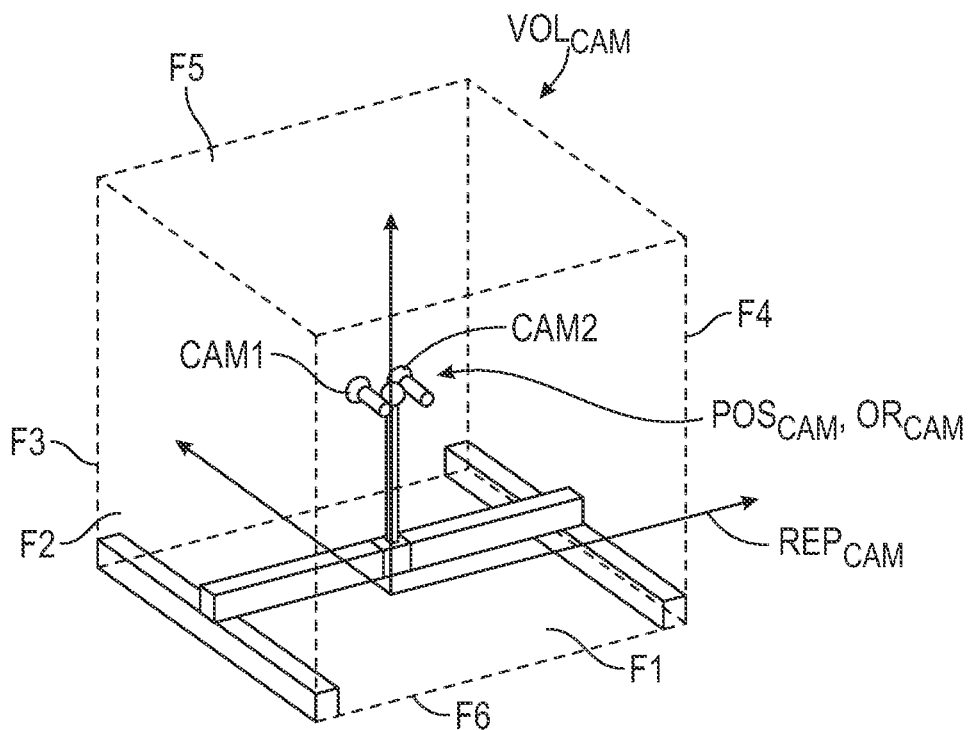
FIG. 1B represents a video acquisition system that can be used in one embodiment of the invention.

In one embodiment represented in FIG. 1B, the video acquisition system CAL includes two cameras $CAM_1$ and $CAM_2$. A motor can allow managing the spacing between the cameras as a function of the spacing between the pupils.

This system CAM can be remotely piloted via a network NET to track the movements of the head of a user USR. This network is for example a high-performance network of the 5G type with very low latency and very high speed allowing the transmission of the video streams and the commands of the movements of the articulated arm in real time.

Figure 3:
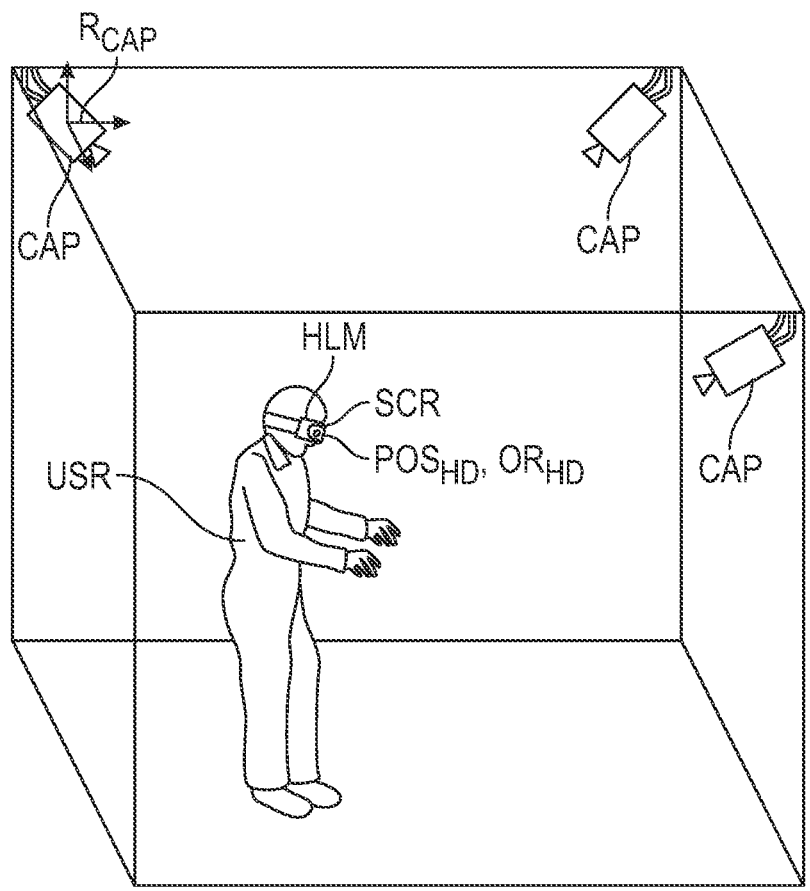
FIG. 3 represents a user of the invention in his environment.

For this purpose, and as represented in FIG. 3, the user USR is equipped with a virtual reality helmet HLM whose position $POS_{HD}$ and orientation $OR_{HD}$ can be determined by a sensor network CAP, in a marker $REP_{CAP}$ linked to this sensor network.

If the virtual reality helmet HLM is able to track the user's gaze, the focus point of each camera $CAM_1$, $CAM_2$ can be varied.

Figure 2:
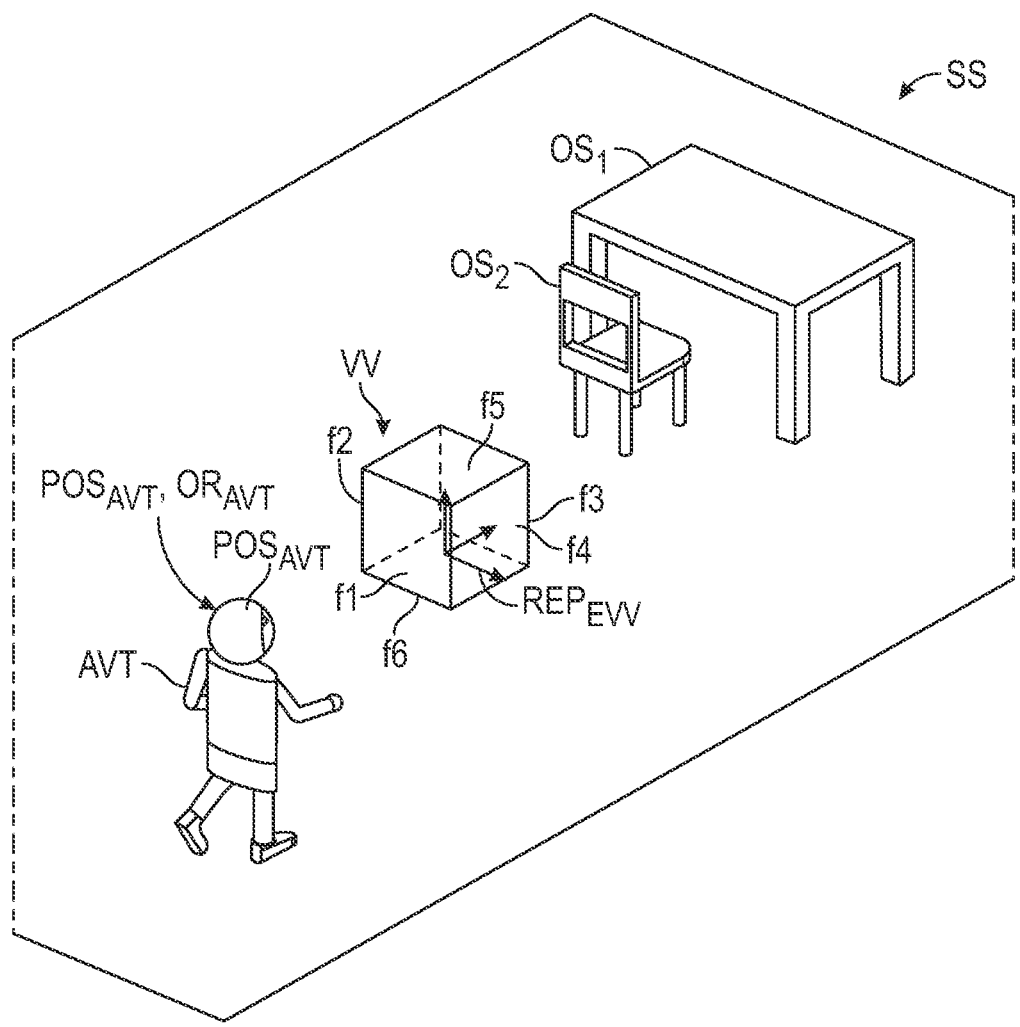
FIG. 2 represents one example of a synthetic scene.

FIG. 2 represents a synthetic scene SS including synthetic objects W and $OS_i$. One of these synthetic objects VV is a virtual finite volume. The following will only focus on this synthetic object (or virtual object) VV.

An avatar AVT of the user USR can move around in the synthetic scene SS.

In the embodiment described here with reference to FIGS. 1 and 2, the volumes $VOL_{CAM}$ and VV have the same substantially cubic shape.

These volumes could have another same shape, for example a spherical or an ovoid shape.

These volumes can also be of different shapes. For example, the displacement volume $VOL_{CAM}$ of the video acquisition system can be parallelepipedic and the virtual volume VV can be spherical.

The volume of the synthetic object VV can be comprised in the volume $VOL_{CAM}$ in which said video acquisition system CAM is likely to move.

The dimensions of the virtual volume VV are slightly smaller than those of the volume $VOL_{CAM}$ in which the video acquisition system CAM can move. The virtual volume W can be part of the volume $VOL_{CAM}$. This characteristic also allows preventing the robotic arm from being in abutment when the eyes of the avatar AVT reach the limit of the virtual volume VV.

The position and the orientation of the eyes of the avatar AVT in a marker $REP_{EVV}$ linked to the virtual volume are denoted respectively $POS_{AVT}$ and $OR_{AVT}$.

The marker $REP_{CAM}$ linked to the video acquisition system and the marker $REP_{EVV}$ linked to the virtual volume VV are matched so that any point of the virtual volume VV corresponds to a point of the displacement volume $VOL_{CAM}$ of the acquisition system CAM.

In this example, the faces of the volume $VOL_{CAM}$ are denoted $F_i$ and the corresponding faces of the volume VV are denoted $f_i$.

In the same way, the marker $REP_{EVV}$ linked to the virtual volume W and the marker $REP_{CAP}$ linked to the sensor network CAP are matched.

Thus, the synthetic object VV allows materializing the volume covered by the acquisition system displacement and associating transmission start and end steps therewith, making the transmission more natural, more comfortable for the user who leaves the synthetic object when the acquisition system reaches the limit of its displacement volume, thus ending the transmission of the video provided by the acquisition system.

Figure 4:
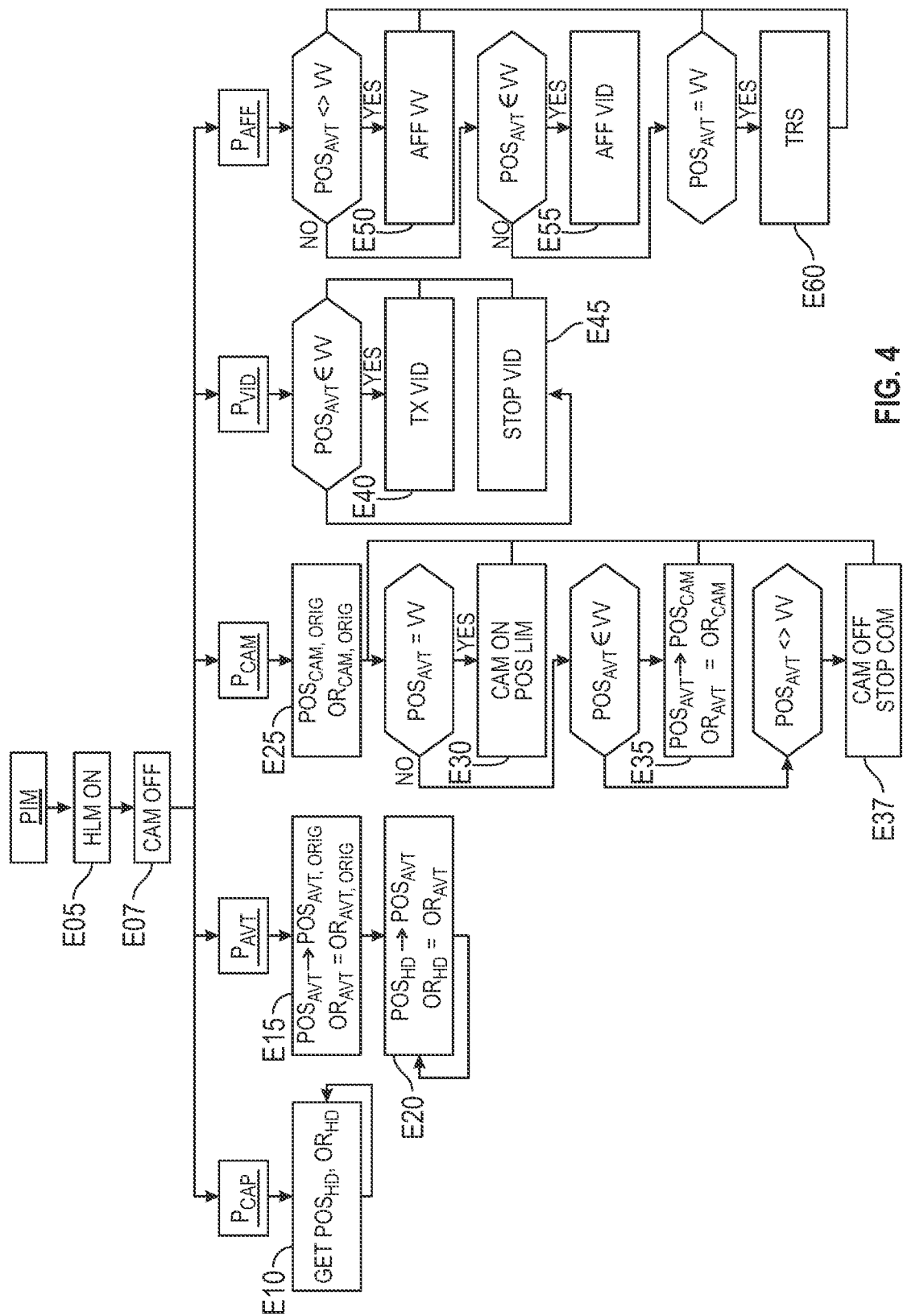
FIG. 4 represents in the form of a flowchart the main management steps of an immersion method in accordance with one embodiment of the invention.

FIG. 4 represents the main steps of an immersion method $P_{IMM}$ in accordance with one particular embodiment of the invention.

It will be assumed that the user turns on his virtual reality helmet during a step E05.

Figure 5:
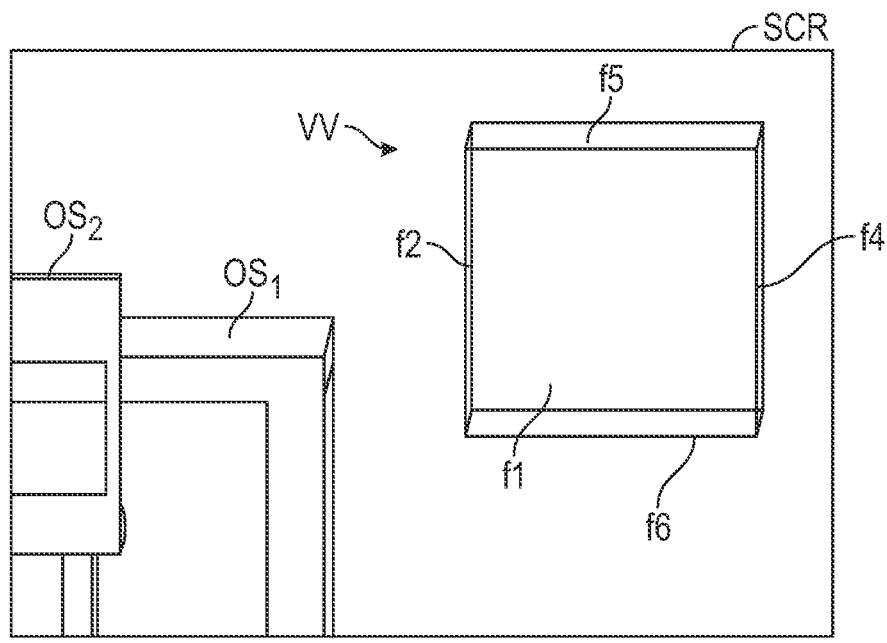
FIG. 5 represents a content projected on a screen of a virtual reality helmet of the user of FIG. 4.

The synthetic scene SS of FIG. 2 is projected on a screen SCR of a helmet HLM. The content appearing on this screen is represented in FIG. 5. The virtual volume W and portions of the synthetic objects $OS_1$ and $OS_2$ are recognized.

The video acquisition system CAM is turned off, its position can be predefined or arbitrary. It does not transmit video streams.

In the embodiment described here, the immersion method includes a process $P_{CAP}$ to obtain (step E10) the current position $POS_{HD}$ and the current orientation $OR_{HD}$ of the head of the user USR in the marker $REP_{CAP}$ linked to the sensor network.

In the embodiment described here, the immersion method $P_{IMM}$ includes a process $P_{AVT}$ to monitor the position $POS_{AVT}$ and the orientation $OR_{AVT}$ of the eyes of the avatar AVT in the marker $REP_{EVV}$ linked to the virtual volume VV. This process $P_{AVT}$ is called avatar AVT monitoring process.

In the embodiment described here, when the virtual reality helmet is turned on (step E05), the avatar monitoring process $P_{AVT}$ positions and orients the eyes of the avatar AVT to an original position $POS_{AVT, ORIG}$ and according to a predetermined original orientation $OR_{AVT, ORIG}$ (step E15), outside the virtual volume VV.

Then, during a general step E20, the avatar monitoring process $P_{AVT}$ monitors the position $POS_{AVT}$ and the orientation $OR_{AVT}$ of the eyes of the avatar AVT in the marker $REP_{EVV}$ as a function of the position $POS_{HD}$ and orientation $OR_{HD}$ of the head of the user USR in the marker $REP_{CAP}$.

In the embodiment described here, the immersion method $P_{IMM}$ includes a process $P_{VID}$ for monitoring the video stream of the video acquisition system CAM. This process $P_{VID}$ is called video monitoring process.

In the embodiment described here, the video monitoring process $P_{VID}$ includes a step to determine whether the current position of the eyes of the avatar $POS_{AVT}$ is in the virtual volume VV. If this is the case, the video monitoring process $P_{VID}$ sends (step E40) a monitoring message POS to the video acquisition system CAM so that its sends to the virtual reality helmet the video stream acquired by the camera CAM.

In the embodiment described here, the video monitoring process $P_{VID}$ sends (step E45) a monitoring message POS to the video acquisition system CAM so that it stops sending the video stream acquired by the camera CAM to the virtual reality helmet when the eyes of the avatar $POS_{AVT}$ leave and move away from the limit of the virtual volume VV by a determined distance.

In the embodiment described here, the immersion method $P_{IMM}$ includes a process $P_{CAM}$ for monitoring the position of the video acquisition system CAM. This process $P_{CAM}$ is called camera monitoring process.

In the embodiment described here, when the virtual reality helmet is turned on (step E05), the video monitoring process $P_{VID}$ sends (step E25) a monitoring message POS to the video acquisition system CAM so that the robotic arm positions and orients this system CAM according to an original position $POS_{CAM, ORIG}$ and according to an original orientation $OR_{CAM, ORIG}$ determined in a marker $REP_{CAM}$ linked to the video acquisition system.

In the embodiment described here, the camera monitoring process $P_{CAM}$ includes a step to determine whether the current position of the eyes of the avatar $POS_{AVT}$ is close and outside the virtual volume VV. If this is the case, the camera monitoring process $P_{CAM}$ sends (step E30) a monitoring message POS to the video acquisition system CAM to turn it on and so that the robotic arm places it at the limit of the volume $VOL_{CAM}$ according to a position and an orientation corresponding to those of the eyes of the avatar AVT. For example, if the avatar AVT is outside and in the vicinity of a northern limit of the virtual volume VV, oriented along a South-West direction, the video acquisition system is positioned at the northern limit of the volume $VOL_{CAM}$ and oriented along the South-West direction.

As a variant, the camera monitoring process $P_{CAM}$ sends (step E30) a monitoring message POS to the video acquisition system CAM so that it places itself at the limit of the volume $VOL_{CAM}$ according to predetermined position and orientation.

In the embodiment described here, the camera monitoring process $P_{CAM}$ includes a step to determine whether the current position of the eyes of the avatar $POS_{AVT}$ is in the virtual volume VV. If this is the case, the camera monitoring process $P_{CAM}$ sends (step E35) a monitoring message to the video acquisition system CAM so that the robotic arm modifies its position $POS_{CAM}$ and its orientation $OR_{CAM}$ in the marker $R_{CAM}$ as a function of the position $POS_{AVT}$ and of the orientation $OR_{AVT}$ of the eyes of the avatar in the marker $REP_{EVV}$.

As long as the eyes of the avatar AVT are in the virtual volume VV, the robotic arm adapts the position and the orientation of the video acquisition system CAM based on the received information.

If the eyes of the avatar AVT leave and move away from the virtual volume by a determined distance, the camera monitoring process $P_{CAM}$ turns off the video acquisition system CAM and ends the communication established with this system CAM.

In the embodiment described here, the immersion method $P_{IMM}$ includes a process $P_{AFF}$ for rendering a content on the screen SCR of the virtual reality helmet. This process $P_{AFF}$ is called rendering process.

In the embodiment described here, the rendering process $P_{AFF}$ includes a step to determine whether the current position of the eyes of the avatar $POS_{AVT}$ is far from the virtual volume VV. If this is the case, the rendering process $P_{AFF}$ displays (step E50) the synthetic scene SS.

In the embodiment described here, the rendering process $P_{AFF}$ includes a step to determine whether the current position of the eyes of the avatar $POS_{AVT}$ is in the virtual volume VV and relatively far from the limit of this volume. If this is the case, the rendering process $P_{AFF}$ displays (step E55) the video stream received from the video acquisition system.

In a known manner, if the video acquisition system consists of two cameras, each eye receives the stream from the corresponding camera.

In the embodiment described here, if the current position of the eyes of the avatar $POS_{AVT}$ is outside or inside the virtual volume VV and close to the limit of this volume, then the rendering process $P_{AFF}$ displays (step E60) a transition content between the video stream received from the video acquisition system and the representation of the virtual volume VV, for example over the entire screen SCR.

This transition content can for example be a standby synthetic image of the color of the virtual volume VV or a fade of the synthetic scene SS and of the video stream received from the acquisition system CAM.

Figure 6A:
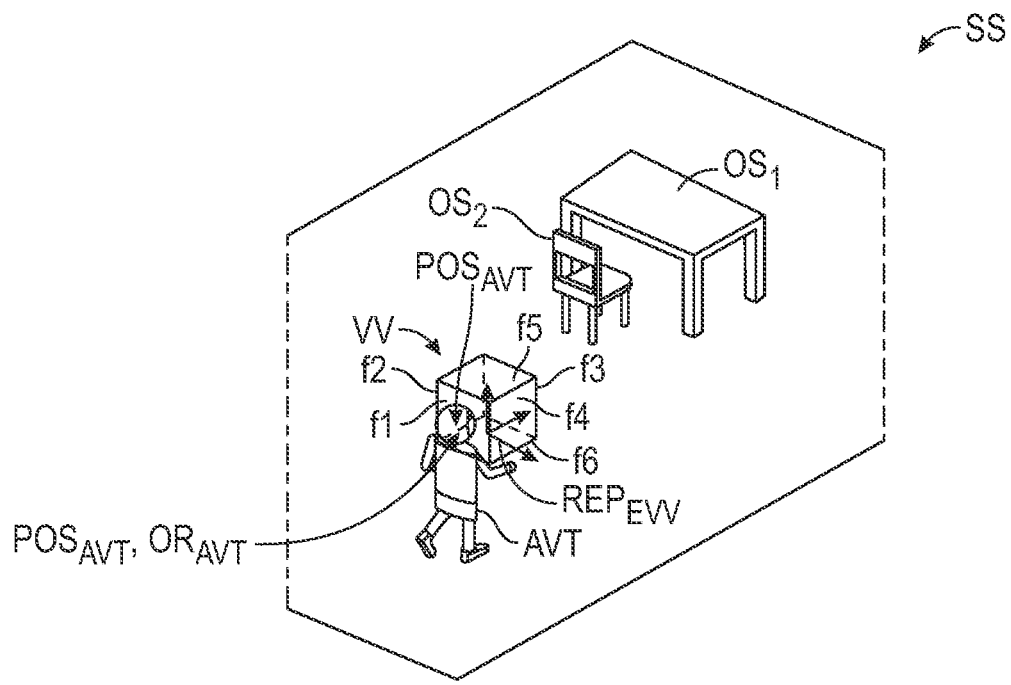
FIG. 6A represents an avatar of the user of FIG. 4 when he enters a virtual volume of the synthetic scene of FIG. 2.

FIG. 6A represents the avatar AVT in a situation in which his eyes are at the level of the face f1 of the virtual volume EVV substantially in its middle. The avatar AVT is oriented perpendicularly to this face, in other words it is heading towards the face f3.

Figure 6B:
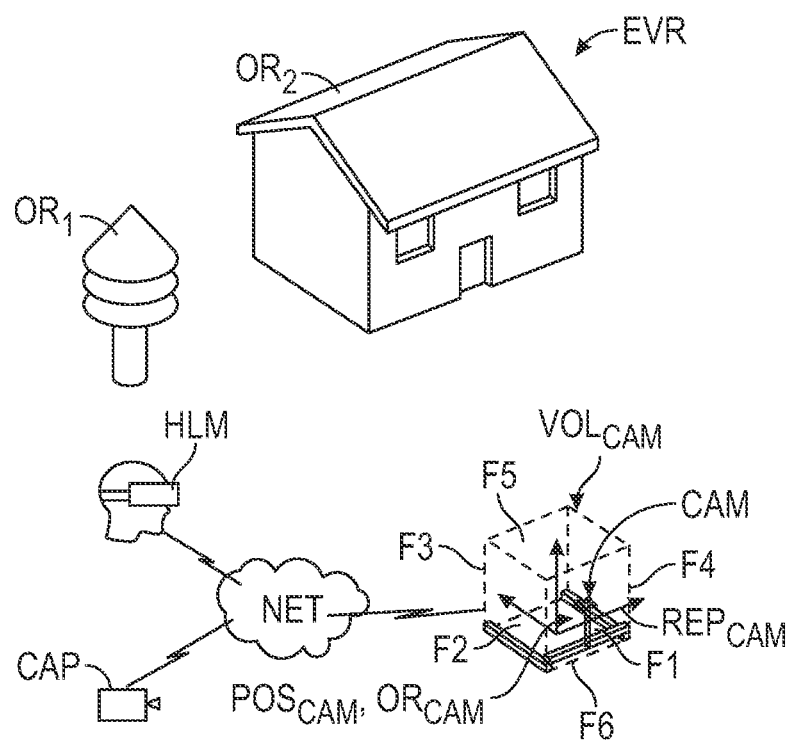
FIG. 6B represents the position of the acquisition system of FIG. 1B under these conditions.
Figure 6C:
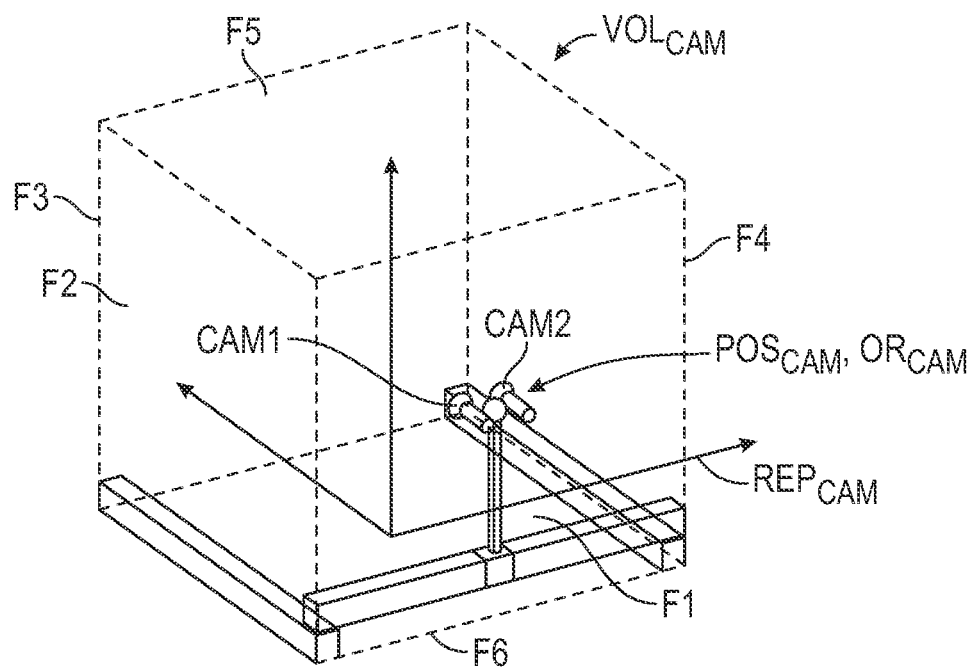
FIG. 6C represents the acquisition system of FIG. 6B in detail.

Consequently, and as represented in FIGS. 6B and 6C, the video acquisition system CAM is positioned at the center of the face F1 of the volume $VOL_{CAM}$, oriented towards the face F3.

Figure 6D:
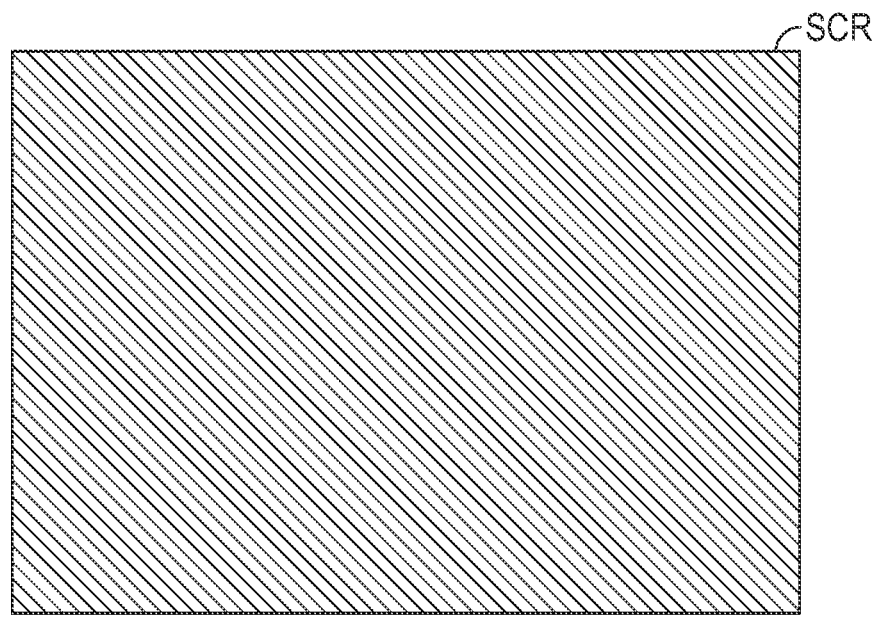
FIG. 6D represents the content projected on the screen of a virtual reality helmet of the user of FIG. 4 under these conditions.

FIG. 6D represents the transition content projected on the screen SCR of the virtual reality helmet HLM. In this example, it is a standby synthetic image of the color of the virtual volume VV.

Figure 7A:
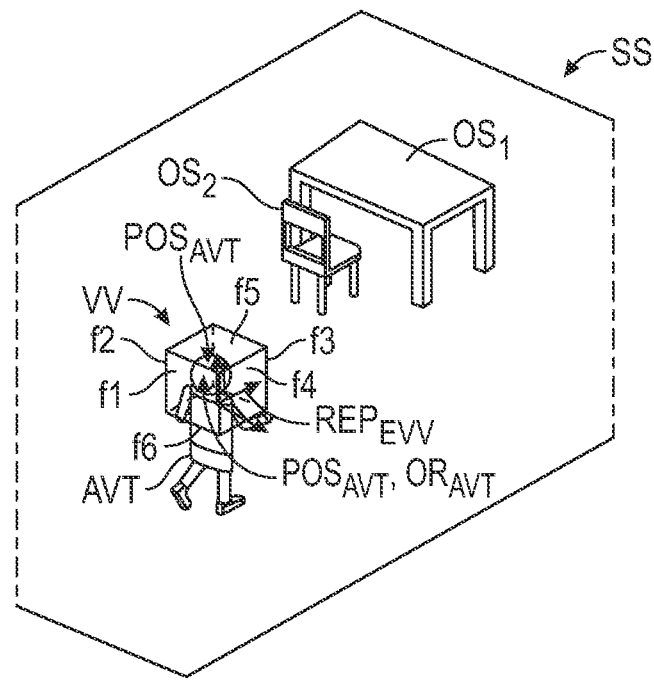
FIG. 7A represents the avatar of the user of FIG. 4 in a first position and a first orientation in the virtual volume of the synthetic scene of FIG. 2.

FIG. 7A represents the avatar AVT in a situation in which his eyes are at the center of the virtual volume EVV substantially in its middle. The avatar AVT is oriented towards the face f3.

Figure 7B:
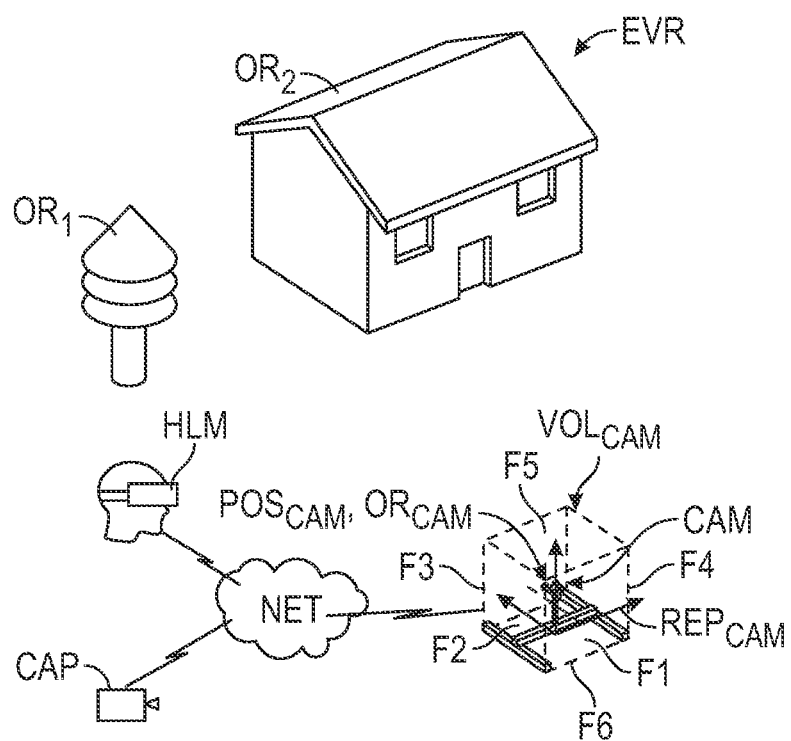
FIG. 7B represents the position of the acquisition system of FIG. 1B under these conditions.
Figure 7C:
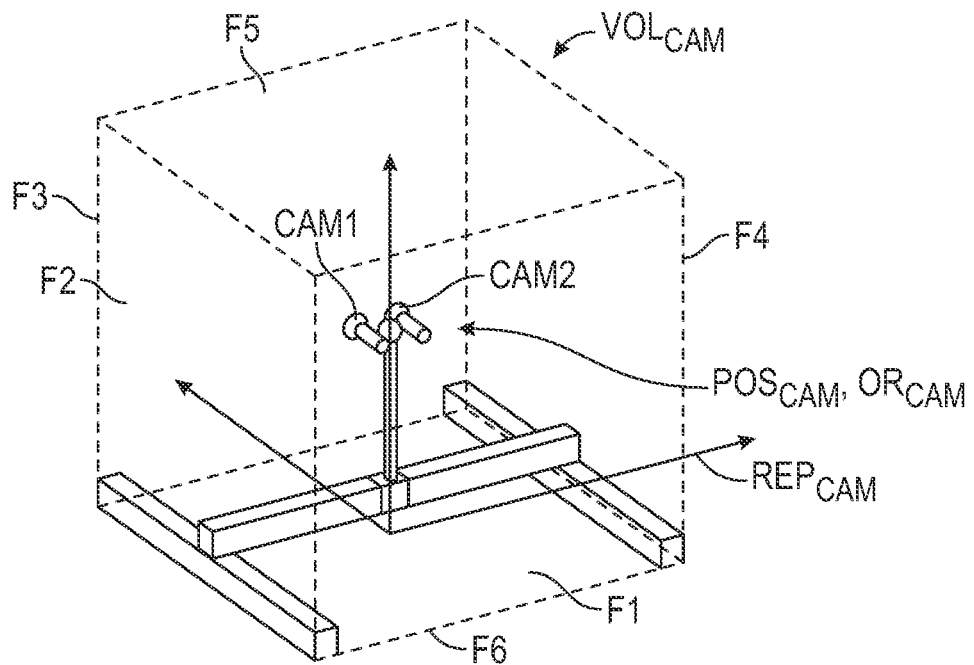
FIG. 7C represents the acquisition system of FIG. 7B in detail.

Consequently, and as represented in FIGS. 7B and 7C, the video acquisition system CAM is positioned at the center of the face F1 of the volume $VOL_{CAM}$, oriented towards the face F3.

Figure 7D:
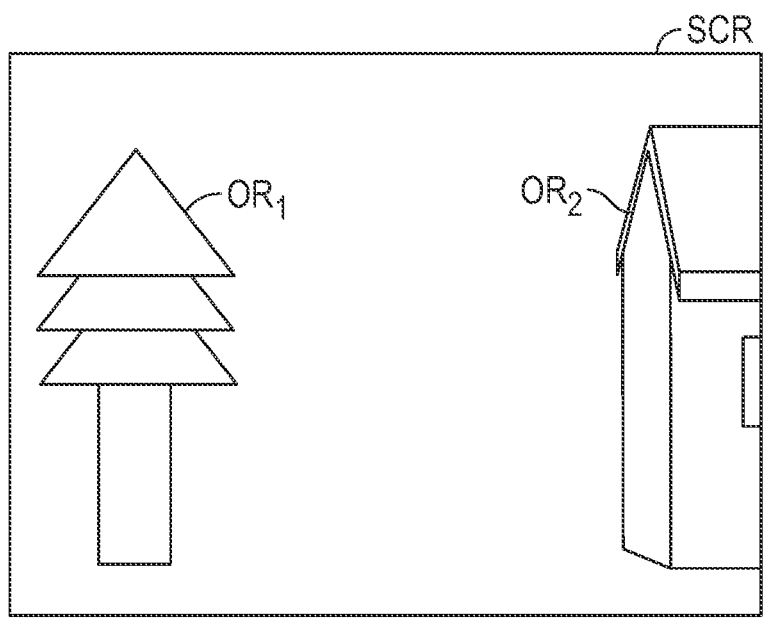
FIG. 7D represents the content projected on the screen of a virtual reality helmet of the user of FIG. 4 under these conditions.

FIG. 7D represents the content projected on the screen SCR of the virtual reality helmet HLM. It is the video stream acquired by the video acquisition system CAM. The real object $OR_1$ and part of the real object $OR_2$ are recognized.

Figure 8A:
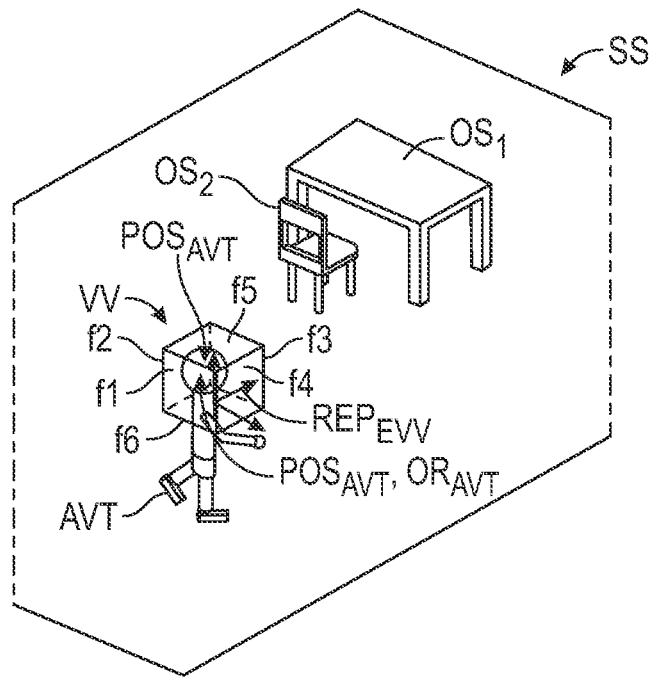
FIG. 8A represents the avatar of the user of FIG. 4 in a second orientation in the virtual volume of the synthetic scene of FIG. 2.

FIG. 8A represents the avatar AVT in a situation in which he turns his head towards the edge defined by the faces f3 and f4.

Figure 8B:
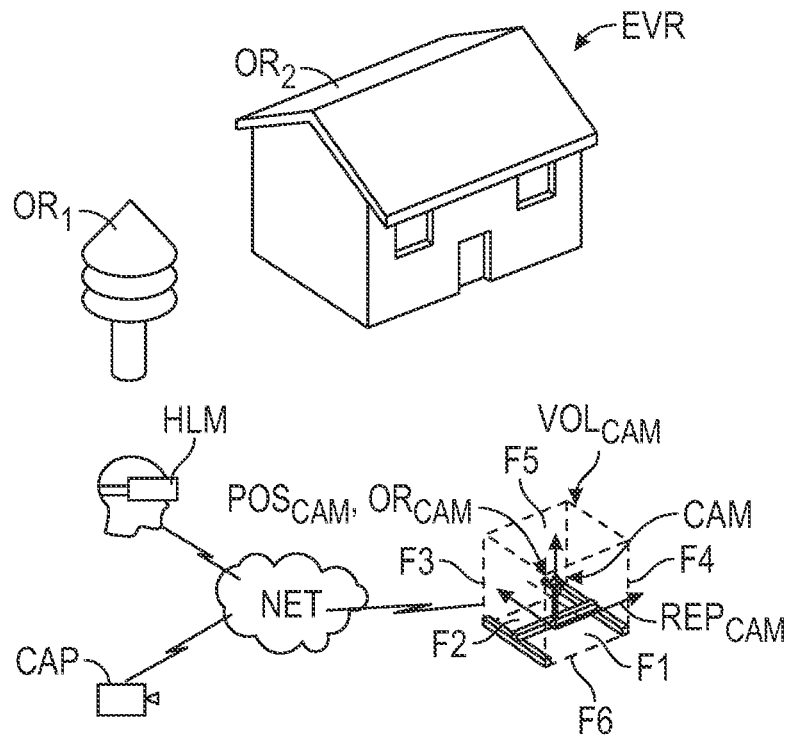
FIG. 8B represents the position of the acquisition system of FIG. 1B under these conditions.
Figure 8C:
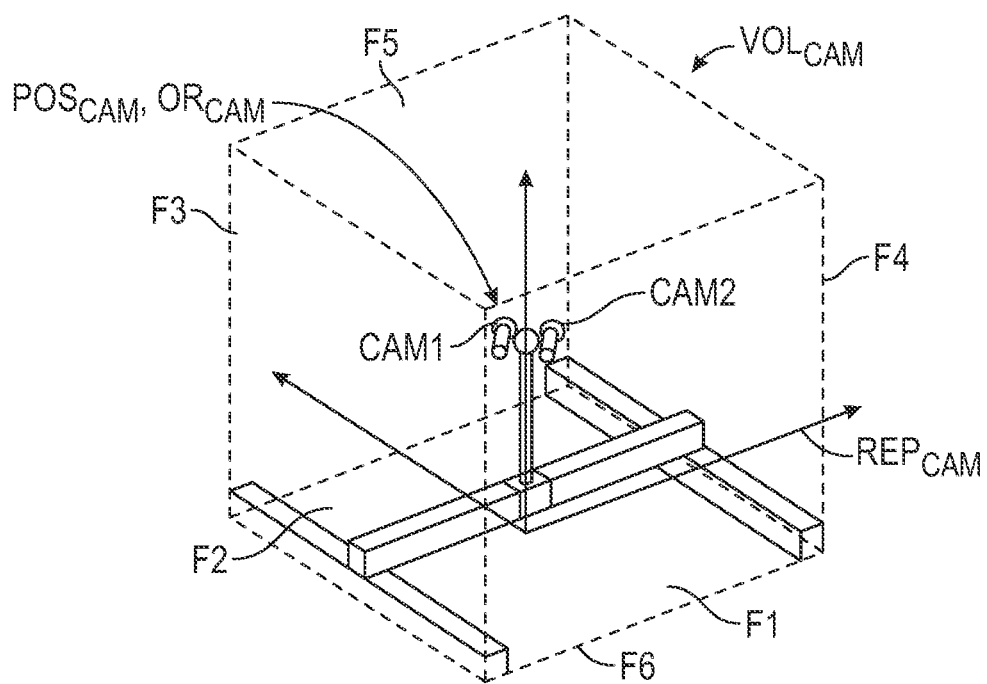
FIG. 8C represents the acquisition system of FIG. 8B in detail.

Consequently, and as represented in FIGS. 8B and 8C, the video acquisition system CAM is oriented towards the edge defined by the faces F3 and F4.

Figure 8D:
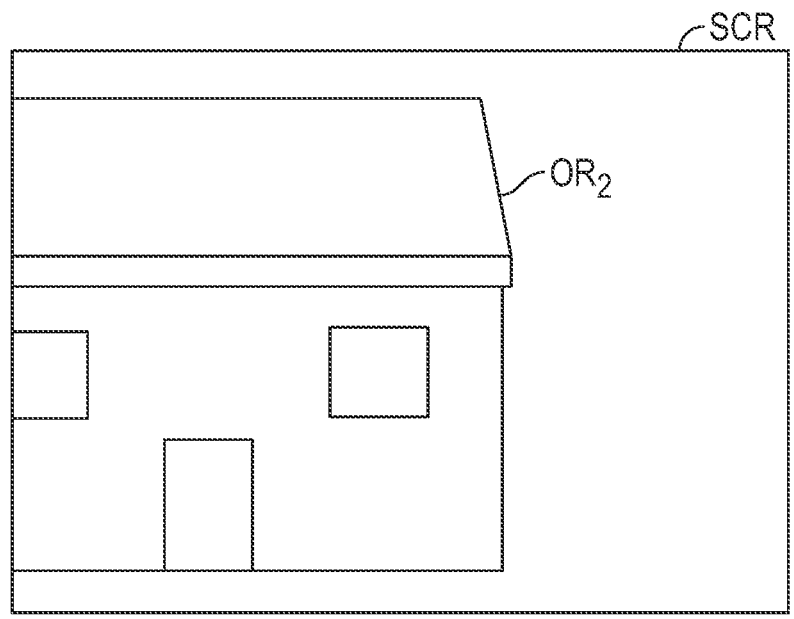
FIG. 8D represents the content projected on the screen of a virtual reality helmet of the user of FIG. 4 under these conditions.

FIG. 8D represents the content projected on the screen SCR of the virtual reality helmet HLM. It is the video stream acquired by the video acquisition system CAM. Part of the real object $OR_2$ is recognized.

Figure 9A:
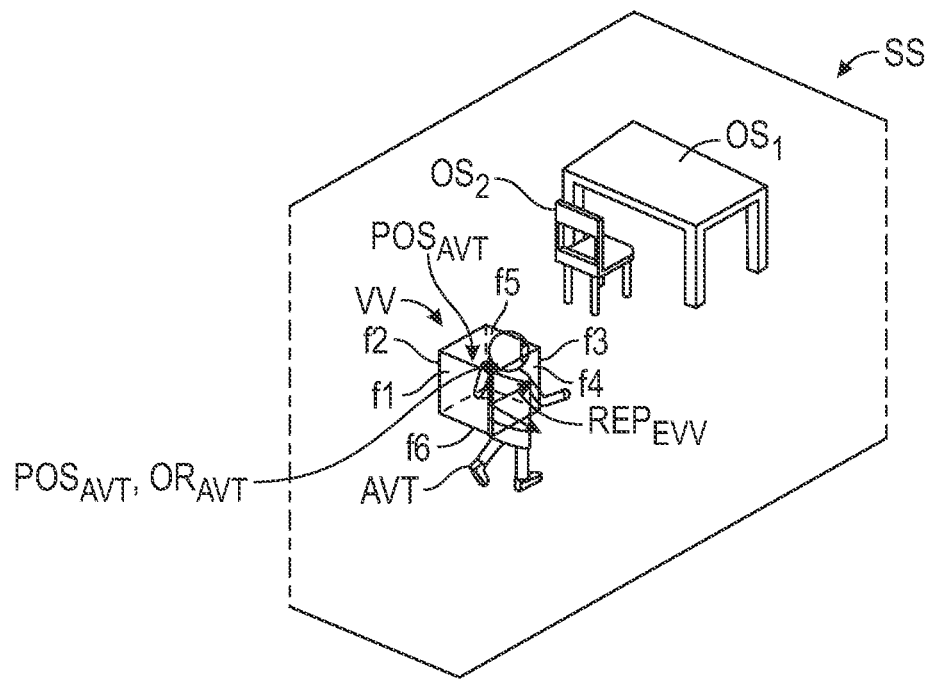
FIG. 9A represents the avatar of the user of FIG. 4 when he leaves the virtual volume of the synthetic scene of FIG. 2.

FIG. 9A represents the avatar AVT in a situation in which his eyes are at the level of the face f3 of the virtual volume EVV substantially in its middle. The avatar AVT is oriented perpendicularly to this face.

Figure 9B:
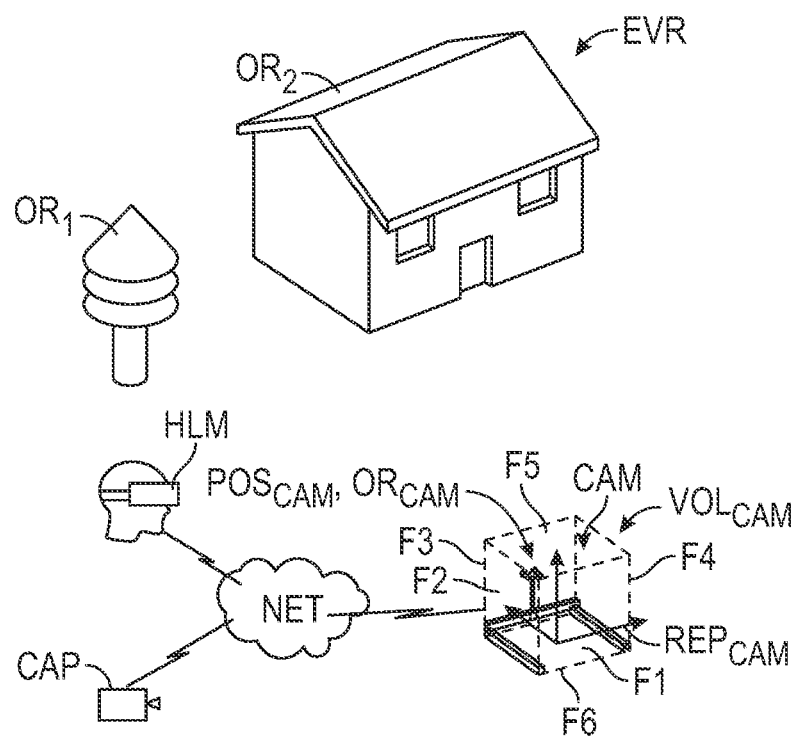
FIG. 9B represents the position of the acquisition system of FIG. 1B under these conditions.
Figure 9C:
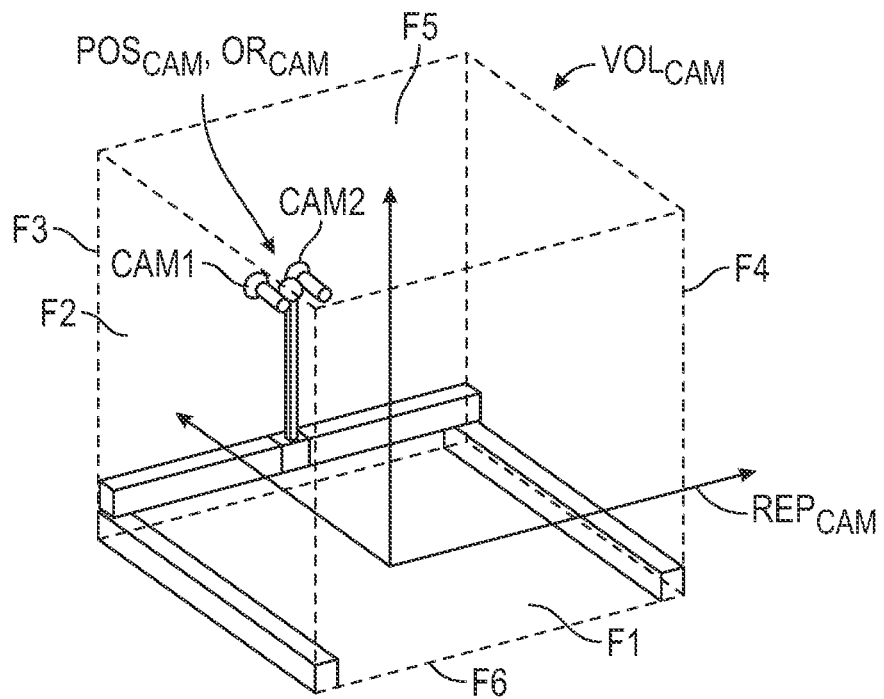
FIG. 9C represents the acquisition system of FIG. 9B in detail.

Consequently, and as represented in FIGS. 9B and 9C, the video acquisition system CAM is positioned at the center of the face F3 of the volume $VOL_{CAM}$, oriented perpendicularly to the face F3 and turned outwards the outside of this volume.

Figure 9D:
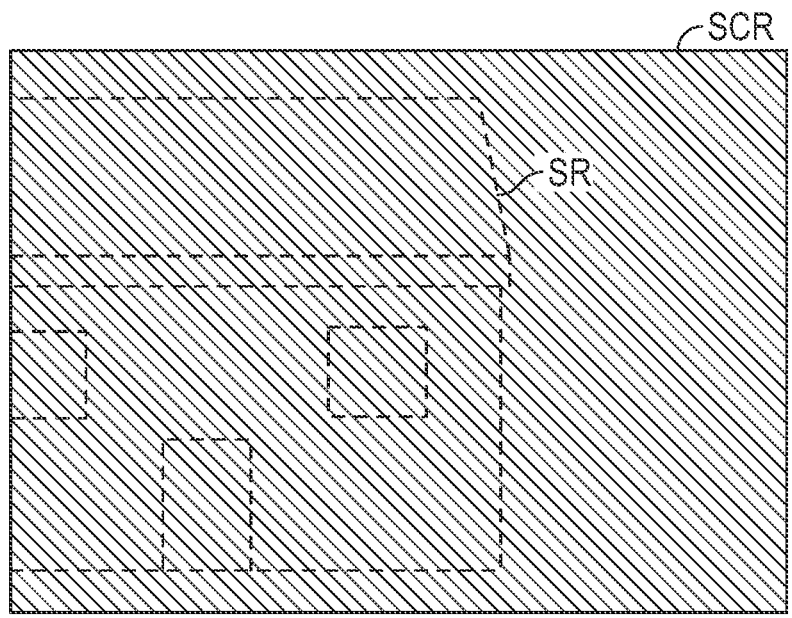
FIG. 9D represents the content projected on the screen of a virtual reality helmet of the user of FIG. 4 under these conditions.

FIG. 9D represents the transition content projected on the screen SCR of the virtual reality helmet HLM. In this example, it is a fade between the video stream of the acquisition system CAL and a standby synthetic image of the color of the virtual volume VV.

Figure 10A:
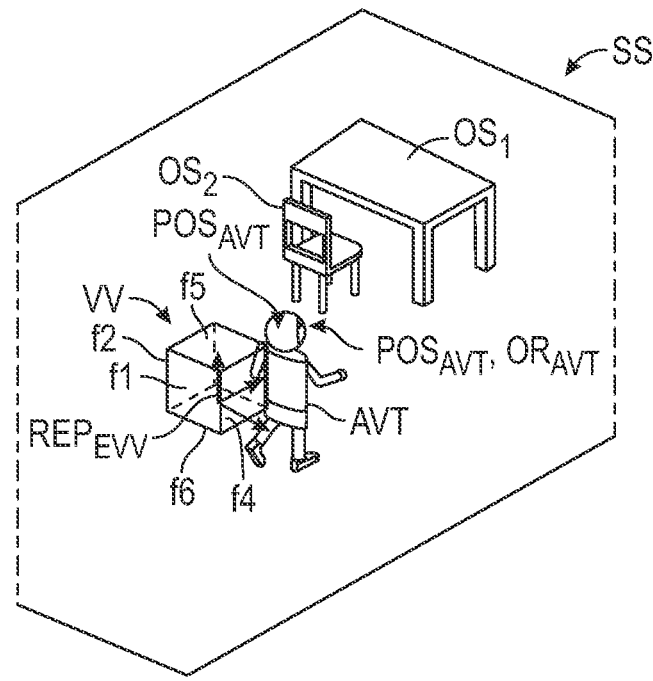
FIG. 10A represents the avatar of the user of FIG. 4 outside the virtual volume of the synthetic scene of FIG. 2.

FIG. 10A represents the avatar AVT outside the virtual volume VV.

Figure 10B:
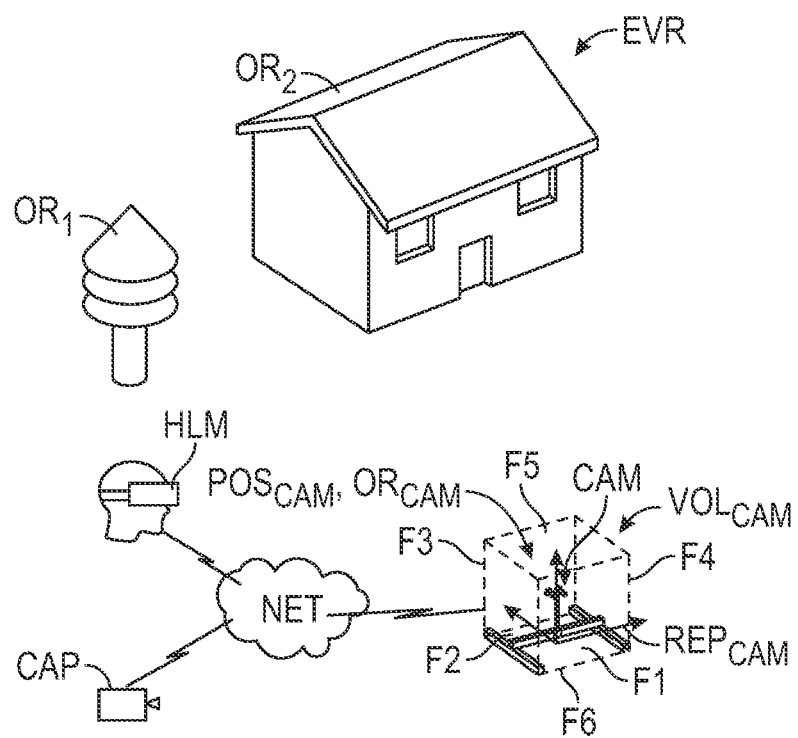
FIG. 10B represents the position of the acquisition system of FIG. 1B under these conditions.
Figure 10C:
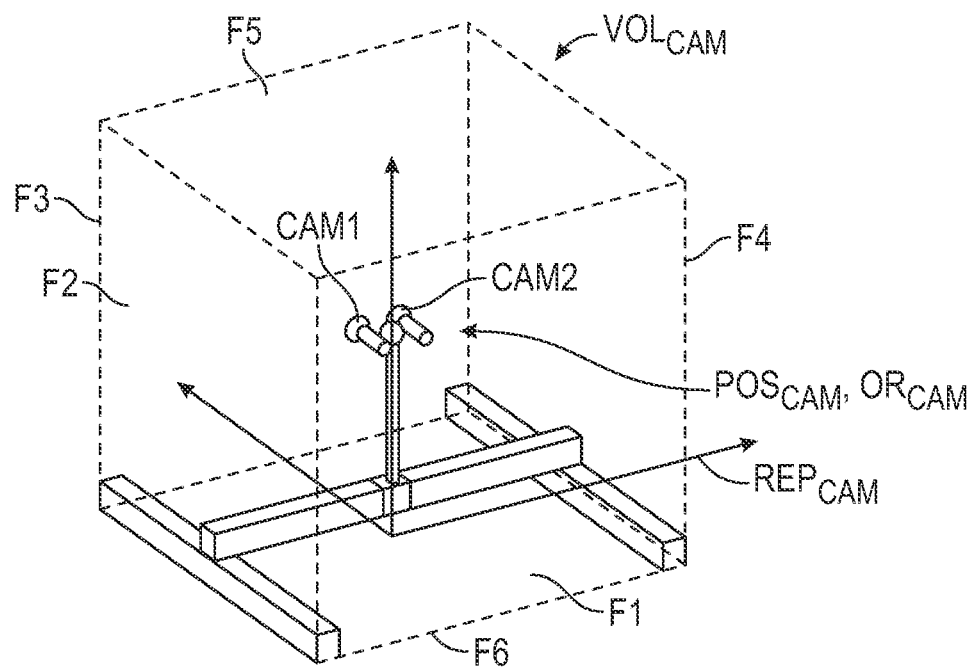
FIG. 10C represents the acquisition system of FIG. 10B in detail.

In the embodiment described here, and as represented in FIGS. 10B and 10C, the video acquisition system CAM is positioned in a neutral position, substantially at the center of the volume $VOL_{CAM}$.

Figure 10D:
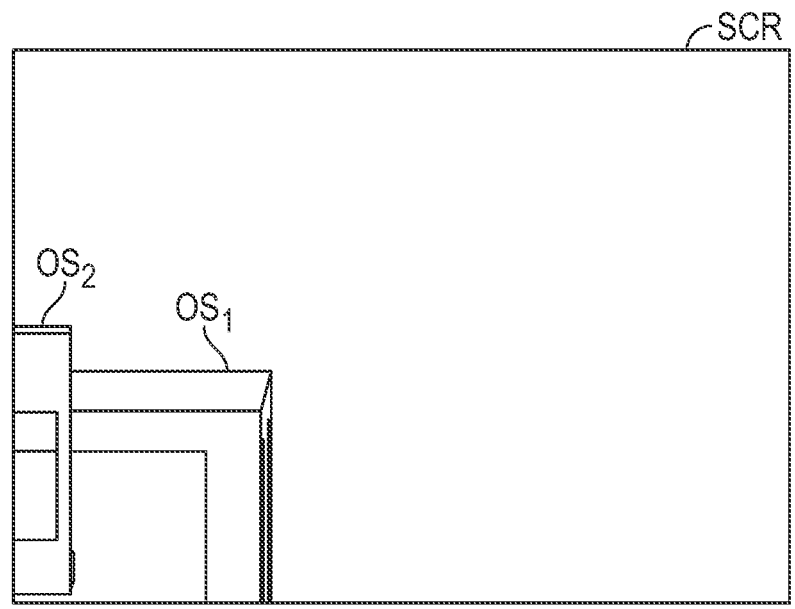
FIG. 10D represents the content projected on the screen of a virtual reality helmet of the user of FIG. 4 under these conditions.

FIG. 10D represents the content projected on the screen SCR of the virtual reality helmet HLM. It is the synthetic scene SS seen from the eyes of the avatar AVT. Part of the synthetic objects $OS_1$ and $OS_2$ is recognized.

Figure 11:
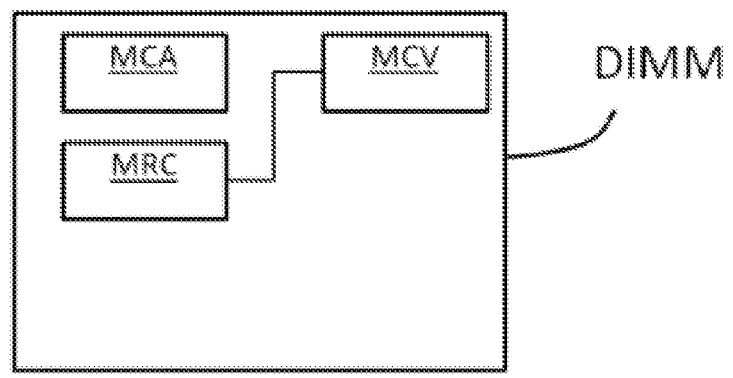
FIG. 11 represents the functional architecture of an immersion device in accordance with one embodiment of the invention.

FIG. 11 represents the functional architecture of a device for immersing DIMM a user in a virtual reality application, in accordance with one particular embodiment.

This device includes:
 a module MCA for monitoring the displacement of an avatar AVT of a user in a synthetic scene;
 a module MCV for monitoring the displacements of a video acquisition system as a function of the detected displacements of the head of said user; and a module MRC for rendering a content on a screen SCR of a virtual reality helmet of the user USR, said content being a video stream acquired by said video acquisition system if the position of the eyes of the avatar is in a synthetic object whose volume can be comprised in a volume in which said video acquisition system is likely to move.

Figure 12:
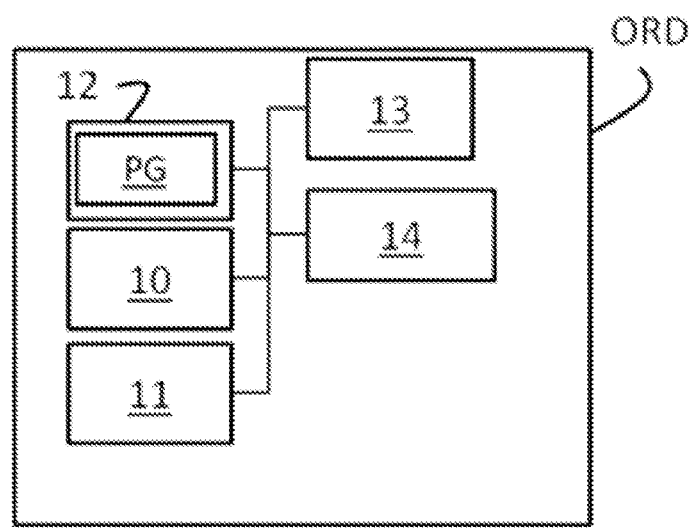
FIG. 12 represents the hardware architecture of an immersion device in accordance with one embodiment of the invention.

This device DIMM can have the hardware architecture of a computer as represented in FIG. 12.

This computer ORD includes in particular a processor 10, a random access memory of the RAM type 11, a read only memory of the ROM type 12, a rewritable non—volatile memory of the Flash type 14 and communication means 13.

The read only memory 12 constitutes a medium in accordance with one particular embodiment of the invention. This memory includes a computer program PG in accordance with one particular embodiment of the invention, which when it is executed by the processor 10, implements an immersion method in accordance with the invention and described above with reference to FIG. 4.

The invention claimed is:

1. A method for immersing a user in a virtual reality application, the method including:
    monitoring a displacement of an avatar of a user in a synthetic scene;
    a step of monitoring displacements of a video acquisition system as a function of detected displacements of a head of the user, the orientation of the avatar being monitored as a function of the orientation of the head of the user; and
    upon a determination that a position of the eyes of the avatar is in a synthetic object whose volume is able to be comprised in a volume in which said video acquisition system is likely to move, rendering a content on a screen of a virtual reality helmet of the user, said content being a video stream acquired by said video acquisition system.

2. The method of claim 1, further comprising, upon a determination that the position of the eyes of the user is outside the synthetic object, rendering the synthetic scene on said screen.

3. The method of claim 1, further comprising, upon a determination that the position of the eyes of the avatar is close to the limit of the synthetic object, rendering on said screen a transition content between the video stream acquired by said system and the synthetic scene.

4. The method of claim 3, wherein the transition content is a synthetic image of the color of said synthetic object.

5. The method of claim 3, wherein the transition content is a fade between the video stream acquired by said video acquisition system and the synthetic scene.

6. A device for immersing a user in a virtual reality application, the device including:
    at least one processor; and
    at least one non-transitory computer readable medium comprising instructions stored thereon which when executed by the at least one processor configure the device to implement a method comprising:
        monitoring a displacement of an avatar of a user in a synthetic scene;
        monitoring displacements of a video acquisition system as a function of detected displacements of a head of said user, the orientation of the avatar being monitored as a function of the orientation of the head of the user; and
        rendering a content on a screen of a virtual reality helmet of the user, said content being a video stream acquired by said video acquisition system if a position of the eyes of the avatar is in a synthetic object whose volume is able to be comprised in a volume in which said video acquisition system is likely to move.

7. A system including:
    sensors for detecting displacements of a head of a user,
    a video acquisition system (CAM),
    a virtual reality helmet, and
    the immersion device of claim 6 configured to:
        monitor displacements of said video acquisition system and,
        render a content on a screen of said virtual reality helmet, said content being a video stream acquired by said video acquisition system if the position of the eyes of an avatar of the user monitored by said device is in a synthetic object whose volume can be comprised in a volume in which said video acquisition system is likely to move.

8. The system of claim 7 wherein said video acquisition system (CAM) includes two cameras.

9. A non-transitory computer readable medium having stored thereon instructions which, when executed by a processor, cause the processor to implement the method of claim 1.

* * * * *